US 6,422,291 B1

(12) United States Patent
Brunnert et al.

(10) Patent No.: US 6,422,291 B1
(45) Date of Patent: Jul. 23, 2002

(54) ROLL-UP BLIND WITH STOWABLE GUIDING MEMBERS FOR THE WINDOW OF A VEHICLE

(75) Inventors: Bernd Brunnert, Plochingen; Marina Ehrenberger, Esslingen; Holger Seel, Aidlingen, all of (DE)

(73) Assignee: Baumeister & Ostler GmbH & Co. (DE)

( * ) Notice: Subject to any disclaimer, the term of this patent is extended or adjusted under 35 U.S.C. 154(b) by 0 days.

(21) Appl. No.: 09/762,374
(22) PCT Filed: Jul. 26, 1999
(86) PCT No.: PCT/DE99/02288
§ 371 (c)(1),
(2), (4) Date: Mar. 19, 2001
(87) PCT Pub. No.: WO00/07837
PCT Pub. Date: Feb. 17, 2000

(30) Foreign Application Priority Data

Aug. 4, 1998 (DE) .......................................... 198 35 257

(51) Int. Cl.[7] .................................................. B60J 3/00
(52) U.S. Cl. ................. 160/370.22; 160/265; 296/97.4; 296/97.8
(58) Field of Search ........................... 160/370.22, 265; 296/97.4, 97.8, 97.7, 97.13

(56) References Cited

U.S. PATENT DOCUMENTS 4,836,263 A * 6/1989 Ament
5,291,934 A * 3/1994 Ouvrard et al.
5,752,560 A * 5/1998 Cherng

FOREIGN PATENT DOCUMENTS

EP 221573 * 5/1987

* cited by examiner

Primary Examiner—Blair M. Johnson
(74) Attorney, Agent, or Firm—Leydig, Voit & Mayer, Ltd.

(57) ABSTRACT

A roll-up window blind (5) for automobile rear windows panes (4) has two actuating levers (9, 11) with which the pullrod (13) is moved in the direction of reeling-out or reeling-in of the blind material (12). The levers (9, 11) are borne in such manner that, in the reeled-out state, the pullrod (13) is pressed with a tension force against the rear window pane (4). In order to avoid any damage to the heating wires, the pullrod (13) is provided on its ends with guide elements (41), which are mounted movably on the pullrod (13). With the blind (5) reeled out, they project over the outer contour of the pullrod (13) and, as they themselves come to lie on the rear window pane (4), they hold the pullrod (13) at a distance from the rear window pane (4). On reeling-in they are retracted behind the outer contours of the pullrod (13), so that they can be retracted into the slot (7) from which the blind material emerges, and, namely, without recesses for the guide elements being necessary on the slot edges (22).

21 Claims, 5 Drawing Sheets

ROLL-UP BLIND WITH STOWABLE GUIDING MEMBERS FOR THE WINDOW OF A VEHICLE

FIELD OF THE INVENTION

The invention generally relates to window blinds for use in automobiles.

BACKGROUND OF THE INVENTION

By reason of the body shape in modern motor vehicles the rear window lies relatively flat. Because of this body shape the setting sun can heat up the car interior over a relatively large light-admitting opening. This is especially disadvantageous also because underneath the rear window pane there is located the mostly dark-colored hat deposit space, which warms up strongly in the sunlight, and because of the great distance from the windowpane the sunlight can give off heat well into the car interior.

In order to prevent this, from DE 36 12 165 a roll-up window blind is known which is designed especially for mounting on the rear window. To the roll-up blind there belongs a winding shaft turnably borne underneath the hat deposit space, to which (winding shaft) there is fastened with one edge a roll-up blind. By means of a spring motor, which is seated in the tubular winding shaft, the winding shaft is pre-stressed in the direction of a reeling-in of the roll-up blind. The other edge of the roll-up blind is fastened to a pull-rod which serves as a guide rail for two swingably borne levers. The levers are swingable beside the winding shaft about an axis which is at a right angle to the axis of the winding shaft. By means of a motor drive arrangement, the two levers can be transferred from a position in which they lie about parallel to the winding shaft into an upright position. Since the free ends of the levers are connected with the pull-rod, by the setting-upright of the levers the roll-up blind is reeled out and clamped.

The levers are, to be sure, sufficiently bending-stiff, but nevertheless by reason of their yieldingness they show in operation a vibration in a manner such that the pull-rod moves away from the windowpane or strikes against this.

In order to avoid this effect, on the ends of the pull-rod there are mounted two guide elements which, at least in the last range of the reeling-out stroke of the roll-up blind, come to lie against the inside of the rear window and in cooperation with the rear window impart a pre-stressing to the levers, so that the levers can press the pull-rod with force in the direction toward the rear window. Thereby the above-mentioned vibration effects are avoided.

The guide elements are needed in order to avoid a damaging of the heating wires on the inside of the window pane. In order to achieve this function, however, they must correspondingly overhang the outer contour of the pull-rod.

The overhanging guide elements are troublesome when the pullrod in the reeled-in state is to cover the outlet slot of the roll-up housing, or is to disappear in it. They require a corresponding enlargement of the slot opening on the outlet slot, so that in the reeling-in they can plunge through the outlet slot.

OBJECTS AND SUMMARY OF THE INVENTION

Accordingly, in view of the foregoing, a general object of the present invention is to provide a roll-up window blind for the window of a motor vehicle in which the guide elements do not require any additional recesses in the area of the outlet slot.

In the new roll-up window blind the two guide elements are no longer rigidly seated on the pullrod. They are movable with respect to the pullrod and, with the aid of a correspondingly formed bearing arrangement, they can be drawn back behind the contour of the pullrod or of a cover covering the pullrod. They have two operating positions, namely an operating position in which they are withdrawn behind the contour and a further operating position in which they project beyond the contour of the pullrod, in order to provide their supporting action on the inner side of the windowpane.

With the new solution it does not matter whether the winding shaft is borne in a separate housing or is installed directly on the under side of the hat deposit space or else is lodged in a housing that is lowered in the hat deposit space.

Depending on the form of execution then, the outlet slot can be located in the housing or in the hat deposit space.

With the new arrangement it is likewise possible to attune the pullrod and outlet slot to one another in such manner that a narrow gap remains around the pull rod, which has over its entire length virtually the same width when the pull rod in the reeled-in state is lowered in the outlet slot.

If this gap is felt to be inappropriate because small parts can jam in the gap, there is also the possibility of shaping the pullrod in such a way that with the reeled-in roll-up blind it completely covers the outlet slot.

The guide or spacing elements can be slide skids or small rollers or wheels which in the traveling-out do not slide over the windowpane, but roll over it. Any damage to the heating wires is then still more surely avoided.

The bearing arrangement for the guide elements can be a slide-blocking guide, with the aid of which the guide elements are led between the two end positions. The slide-block guidance can be used both in embodiments with slide skids, and also in embodiments with rotatable rollers.

In the case of a slide skid, the slide-block guide can have the shape of a uniformly curved slot in which the slide skid is guided, secure against turning. It can, however, also take on the form of a L-shaped guide channel if a turnable roller is used. In the case of an L-shaped guide channel, this latter is aligned in such a way that one section runs about horizontally in the direction toward the rear window pane, while the other section goes downward to the next adjacent point of the horizontally running section.

Instead of the slide-block guidance, the guide elements can also be mounted on a bearing carrier which on its part is swingable about a vertical axis.

In all cases the pressing-back of the guide elements behind the contour of the pullrod occurs by the edge of the outlet slot in the reeling-in of the roll-up window blind.

The reeling-out into the overhanging position is brought about most simply with the aid of a pre-stressing arrangement which pre-stresses the bearing arrangement or the guide element in the direction toward the overhanging position.

These and other features and advantages of the invention will be more readily apparent upon reading the following description of preferred exemplary embodiments of the invention and upon reference to the drawings wherein:

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
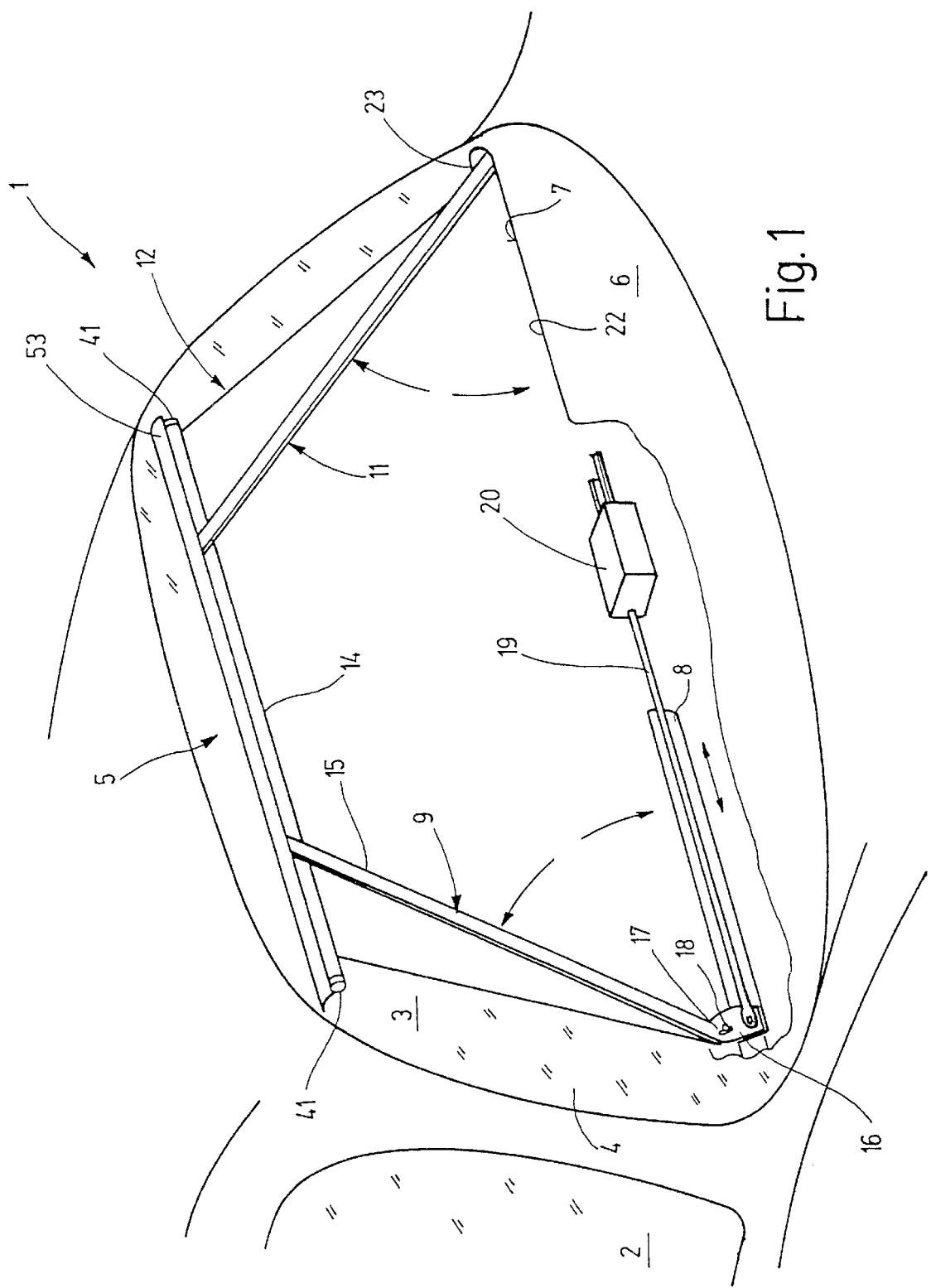
FIG. 1 is a schematic rear perspective view of an illustrative motor vehicle showing a roll-up blind according to the invention in the reeled-out state.

FIG. 1 shows in an extremely schematic manner the rear part of a motor vehicle 1 in a view from the rear. In the perspective representation there is to be recognized a left rear side window 2 as well as a rear window 3 with the inserted, ordinarily curved windowpane 4. In front of the inner side of the windowpane 4 there is present a roll-up window blind 5, which is shown in the reeled-out state.

Further there is to be seen in FIG. 1 a hat deposit area 6, illustrated in broken-open form, in which there is contained an outlet slot 7 extending over the width of the hat deposit area 6.

To the roll-up window blind 5 there belong a winding shaft 8, two actuating levers 9 and 11, a blind material 12 as well as a pullrod 13.

The winding shaft 3, which is to be recognized sectionwise in the broken-open part of the hat deposit area 6, is turnably borne underneath the hat deposit area 6 with bearing arrangements not further shown. In the interior of the winding shaft 8 there is located a spring motor which pre-stresses the winding shaft 8 steadily in the direction of a winding-up of the blind material web 12. The winding shaft 8 lies horizontally about underneath the straight outlet slot 7 and parallel to this.

The blind material 12 consists of a smooth perforated plastic foil which is fastened with one edge to the winding shaft 8 and with its other edge 14, parallel thereto, to the pullrod 13.

The two actuating levers 9 and 11 are in mirror image to one another, so that the description for the actuating lever 9 holds analogously also for the actuating lever 11. The actuating lever 9 is a double-armed lever with a lever section 15 as well as a lever section 16. At the transition point between the two lever sections 15 and 16 there is present a bearing bore 17, with the aid of which the actuating lever 9 is swingably borne on a bearing pivot 18. The bearing pivot 18 is fastened to the underside of the broken-away part of the hat deposit area 6 beside the outlet slot 7. The alignment of the bearing pivot 8 is formed in such manner that the lever section 9 moves in a plane which lies about parallel to the plane defined by the windowpane 4.

The actuating lever 9 can be transferred from a position in which the lever section 15 runs about parallel to the winding shaft 8 into a position in which it lies about parallel to the lateral boundary edges of the rear window 3.

In order to move the actuating lever 9 back and forth between these two end positions, the lower lever section 16 is connected to a drive motor 20, over an actuation rod 19. The actuation rod 19 lies parallel to the winding shaft 8 and likewise underneath the hat deposit area 6 together with the drive arrangement 20. The actuating lever 11 is executed in mirror image and is moved synchronously over a corresponding actuation rod in opposite direction to the actuating lever 9.

In the reeled-out state the two lever sections 15 of the actuating levers 9 and 11, as shown, extend upward through the outlet slot 7, while in the reeled-in state they largely disappear under the hat deposit area 6.

The outlet slot 7 is bounded by two slot edges 22 and 23 which have a spacing from one another such that the two actuating levers 9 and 11 can pass through unimpeded and that also in the actuating levers 9 and 11 the blind material 12 can be drawn out.

With a reeled-in blind the outlet slot 7 is covered by the pullrod 13.

Figure 2:
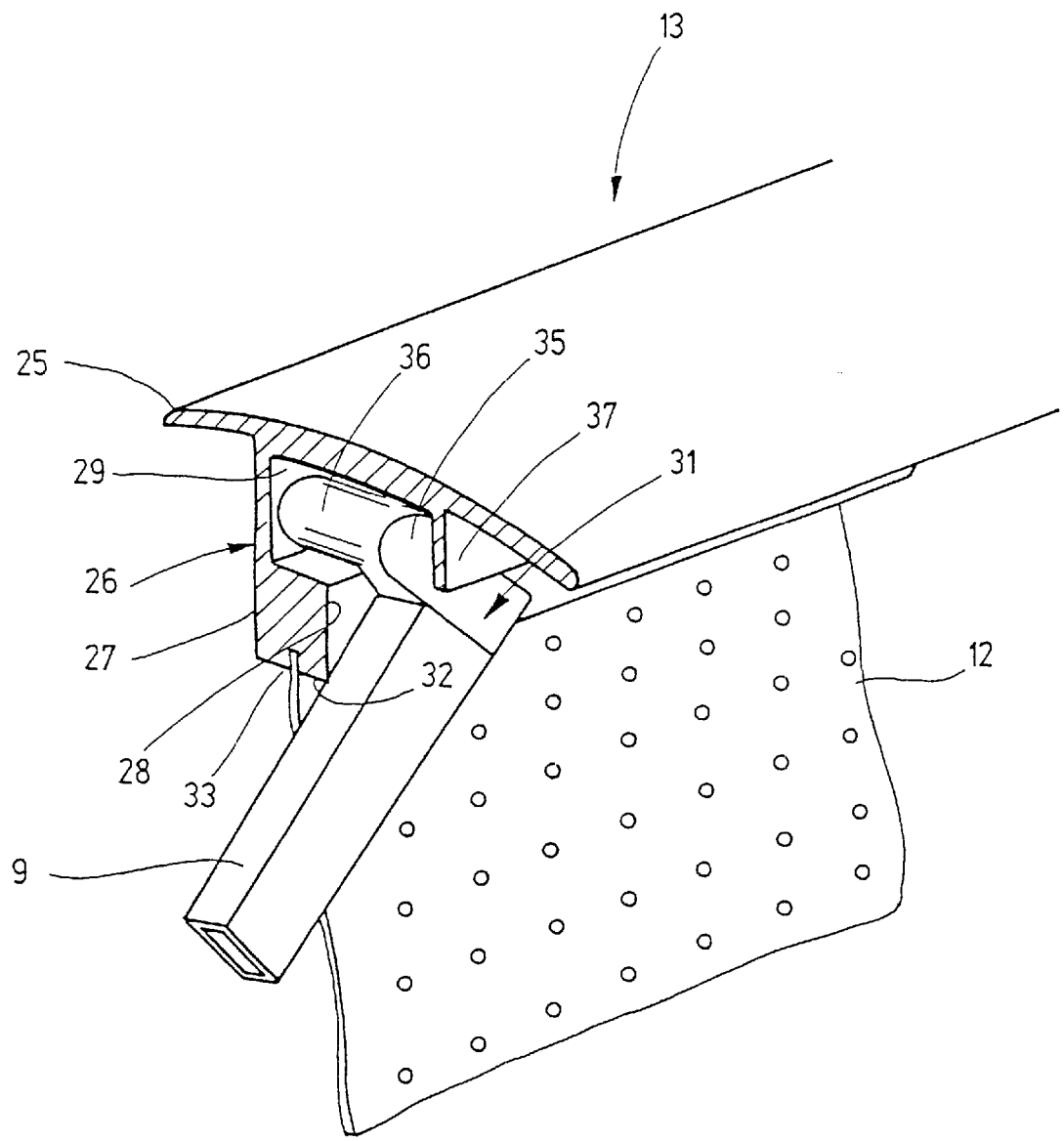
FIG. 2 is an enlarged perspective view of the free end of the actuating lever of the roll-up window blind of FIG. 1 shown sliding in the pullrod.

The connection of the actuating lever 9 with the pullrod 13 as well as its profile are to be perceived from FIG. 2.

The profile of the pullrod 13 is composed imaginatively of a relatively narrow strip 25 cylindrically slightly curved upward, and of a downward-leading center piece 26. Its cross-section, therefore, is about T-shaped and it remains unchanged over the length of the pullrod 13. The width of the strip 25 is dimensioned in such manner that with a reeled-in roll-up window blind 5 it covers the outlet slot 23, whereas the center piece 26 plunges downward through the outlet slot 7. The curvature axis of the cover strip 25 lies parallel to the longitudinal extent of the pullrod 13.

The center piece 26 is bounded by two side surfaces 27 and 28, parallel to one another, which stand perpendicularly on the underside of the strip 25.

Proceeding from the side surface 28 there leads into the center piece 26 a groove 29, rectangular in cross section, which extends into the vicinity of the side wall 27. This groove 29 runs through likewise over the entire length of the pull rod 13 and serves as a guide groove for a head end-piece 31 of the actuating lever 9.

Finally, the center piece contains in its lower side 32 a groove 33 in which the corresponding edge of the blind material 12 is anchored, for example by cementing.

The head end 31 is a multiply bent-off molded part which is inserted with a pivot (not further recognizable) in the tubular actuating lever 9. Proceeding from the free end of the lever 9 the headpiece 31 forms an upward-standing continuation 35, which goes over into a cylindrical pivot 36. The cylindrical pivot 36 extends at a right angle to the longitudinal axis of the lever section 15 and it is laterally offset over a certain distance with respect to the latter.

The pivot 36 lies in the groove 39, whereby there is generated a shiftable coupling between the actuating lever 9 and the pullrod 13.

So that the pivot 36 cannot inadvertently come free from the groove 29 during the actuation of the roll-up window blind 5, there is located at a distance from the groove 29 a downward leading strip 37, which is molded on the underside of the strip 25. Its distance from the side surface 28 corresponds to the thickness of the thickness of the projection 35 measured in this direction.

The actuating lever 11 is guided in the same, but mirror-image manner, likewise in the groove 29.

In case that, by reason of the proportions in the reeled-in state, the actuating levers 9 and 11 were to collide in the groove 29, it is also possible to use two grooves 29 lying one over the other, in which case each groove is provided for one of the actuating levers.

So that in the traveling in and out the pullrod 13 pressed with pre-stressing against the inner side of the windowpane 4 will not damage the heating wires, it is provided with guide elements 41 in the vicinity of both ends. The guide elements 41 are movably borne and in one position stand over the outer contour of the head strip 25 of the pullrod 13, while in the other position they are drawn back with respect to its outer contour.

Figure 3:
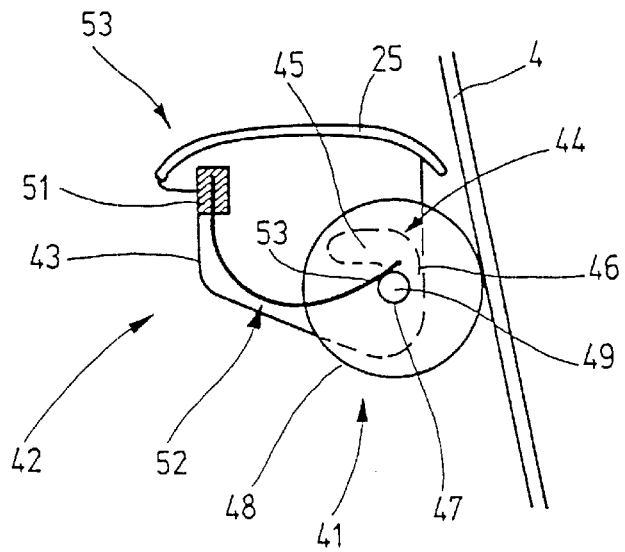
FIG. 3 is a side elevation view of an exemplary embodiment of the guide element for the window blind of FIG. 1.
Figure 4:
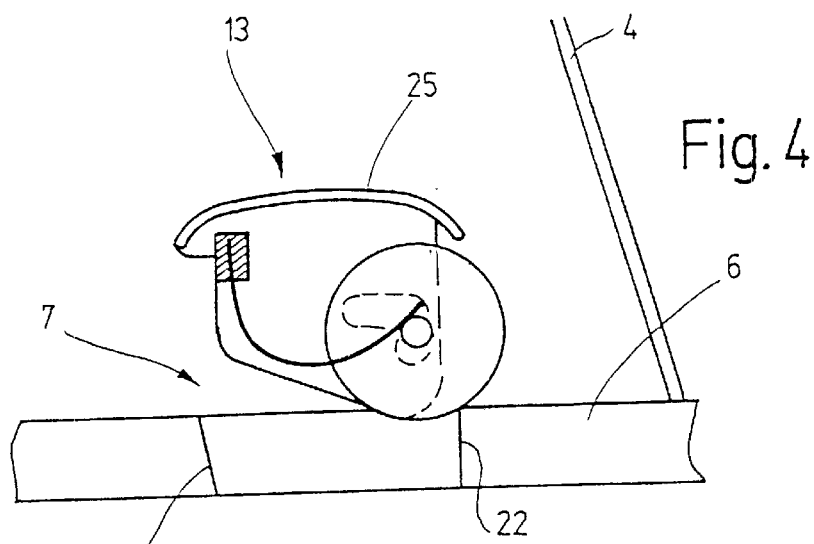
FIG. 4 is a side elevation view of the guide element of FIG. 3 as it runs into the outlet slot.
Figure 5:
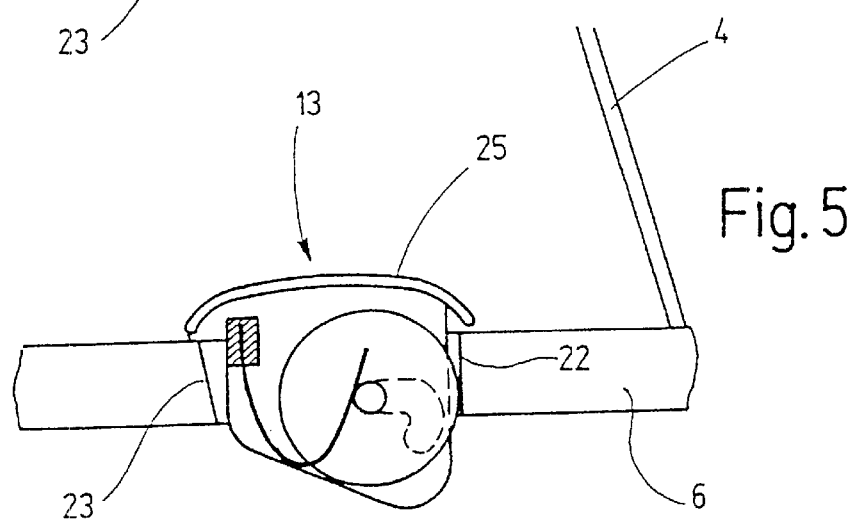
FIG. 5 is a side elevation view of the guide element of FIG. 3 in the completely reeled-in state.

In FIGS. 3 to 5 there is shown, highly schematically, one of the guide elements 41 together with the appertaining bearing arrangement 42.

The bearing arrangement 42 has two plate-shaped bearing flanges 43, running with spacing parallel to one another, which are fastened to the under side of the cover strip 25; the bearing flange facing the observer is omitted. They point to the windowpane 4. The type of fastening to the cover strip 25, for reasons of clarity, is not represented, especially since this is not of significance for the substance of the invention. What is important to notice is merely that the center piece 26 ends at a sufficient distance from the two bearing flanges 43, in order to create space for their fastening to the cover strip 25.

Because of the type of representation, of the two bearing flanges 43 parallel to one another only one of them is to be perceived. This contains, adjacent to the windowpane 4, a slide-block guide in the form of a guide slot 44 closed along the circumference. The guide slot 44 is composed of a straight, horizontally running branch 45, as well as of a curved downward-leading branch 46. The straight, horizontally running branch 45 points to the windowpane 4 and, at its end adjacent to the windowpane 4, it goes over into the descending branch 46.

The descending branch 46 curves, as the figure makes evident, away from the windowpane 4, so that its lower end 47 is at a greater distance from a vertical plane than the transition zone between the branch 45 and the branch 46.

The guide slot 44 has the same width over its entire length.

With the guide slot 44 there is aligned a congruent guide slot which is contained in the broken-away bearing flange.

In the gap between the two bearing flanges 43 there is arranged the guide element 41. The guide element 41 is a small roller with an essentially cylindrical outer circumferential surface 48 and a coaxially penetrating axle 49. The axle 49 projects at both ends over the roller 41 and it extends with its overhanging ends into the two guide slots 44 aligned with one another. The width of the guide slot 44 corresponds in all places to the diameter of the cylindrical axle 49 which lies about parallel to the lengthwise extent of the pullrod 13.

In a transverse bar 51 extending between the two bearing flanges 43 there is clamped at one end a bending spring 52, which presses with its free end 53 against the axle 49. The transverse bar 51 is located above the slot 44, so that by reason of the pre-stressing force of the bending spring 52 the axle 49 is prestressed in the direction toward the lower end 47 of the descending branch 46 of the guide channel 44.

Likewise for reasons of clarity the other parts of the roll-up window blind have been omitted from FIG. 3, in order to make evident the essential substance of the bearing arrangement 42 and of the guide element 41.

With additional reference to the representation in FIGS. 4 and 5 there is now explained the manner of functioning:

In the reeled-in state according to FIG. 5 the pullrod 13 rests with the edges of its cover strip 25 on the hat deposit area 6. It closes the outlet slot 7, which it overhangs with the cover strip 25. In this state the actuating levers 9 and 11 are withdrawn under the hat deposit area 6 (not represented in FIGS. 4 and 5) and, furthermore, the blind material 12 is completely wound up on the winding shaft 8.

In the reeled-in state, by reason of the relative proportions of the thickness of the hat deposit area 6 as well as the spatial position of the guide slot 44, the roller 41 lies with its outer circumferential surface 28 against the edge 22 of the outlet slot 7. Its axle 49 is located there in the farthest remotely lying end of the horizontally running branch 45 of the guide slot 44.

The bending spring 52, which is supported on the circumferential surface of the axle 49, presses the guide roller 51 against the slot edge 22.

In order, proceeding from this position, to draw out the roll-up window blind 5, the motor drive arrangement 20 is set in operation, whereby the actuating levers 9, 11 are increasingly raised out of their position parallel to the winding shaft 8. Hereby they move the pullrod 13 upward and draw the blind material 12 correspondingly out of the outlet slot 7. In the course of the drawing-out the guide roller 41 moves to a position above the outlet slot 7, so that it is no longer pressed back from the slot edge 22 against the action of the bending spring 52. The bending spring 52, therefore, moves the axle 49 into the position according to FIG. 4, i.e. first into the transition zone between the two branches 45 and 46 of the guide slot 44.

As soon as the guide roller 41 with its circumferential surface 48 has become completely free from the slot edge 22, the bending spring 52—by reason of its anchoring point which, as mentioned above, lies above the guide slot 44—will move the axle 49 also downward in the direction to the lower end 47 of the vertical branch 46 of the guide channel 44.

After about 50 to 90% of the maximally possible travel-out stroke, the guide roller 41, as FIG. 3 shows, will come in contact with the inner side of the windowpane 4. Since it overhangs the outer contour of the cover strip 25, it prevents a contact between the windowpane 4 and the cover strip 25.

By reason of the slope between the windowpane 4 and the movement path of the two actuating levers 9 and 11, the force with which the guide roller 41 is pressed into the window pane 4 becomes increasingly greater. Since this force develops exclusively an obliquely downward-directed component on the axle 49, this axle 49 is increasingly pressed against the end 47 of the guide channel 44. This is achieved essentially by the away-yielding course of the lower branch 46 of the guide channel 44.

The bending spring 52 does not need to absorb any force component which derives from the pressing-on force of the guide roller 41 against the windowpane 4.

As soon as the guide roller 41 comes in contact with the windowpane 4, it begins to turn with, or on, its axle 49. Thereby there arises on the inside of the windowpane 4 exclusively a rolling movement and no sliding movement.

In the reeling-in, the process begins in FIG. 3, and shortly before the complete reeling-in, the state according to FIG. 4 is reached. The contact between the outer circumferential surface 48 of the guide roller 51 and the upper edge of the slot flange 23 generates an upward-directed force which is opposed to the force of the bending spring 52, but is greater. The axle 49, therefore, despite the action of the spring 52, is raised and passes into the transition zone between the two branches 45 and 46 of the guide slot 44. The further downward movement then presses the axle 49 against the force of the bending spring 52, back into the horizontal branch 45.

It is obvious that the above-explained processes in the two guide elements 41 take place beside the ends of the pullrod 13.

The new arrangement requires no recesses in the outlet slot in order to make possible the passage-through of the guide elements 41.

In deviation from the embodiment shown, it is also possible to take, instead of for example a wire-form bending spring 52, a leaf spring which is forked at its end adjacent to the axle 49, so that also the axle 49, beside the two face sides of the guide roller 41, exerts a force on the axle 49.

Figure 6:
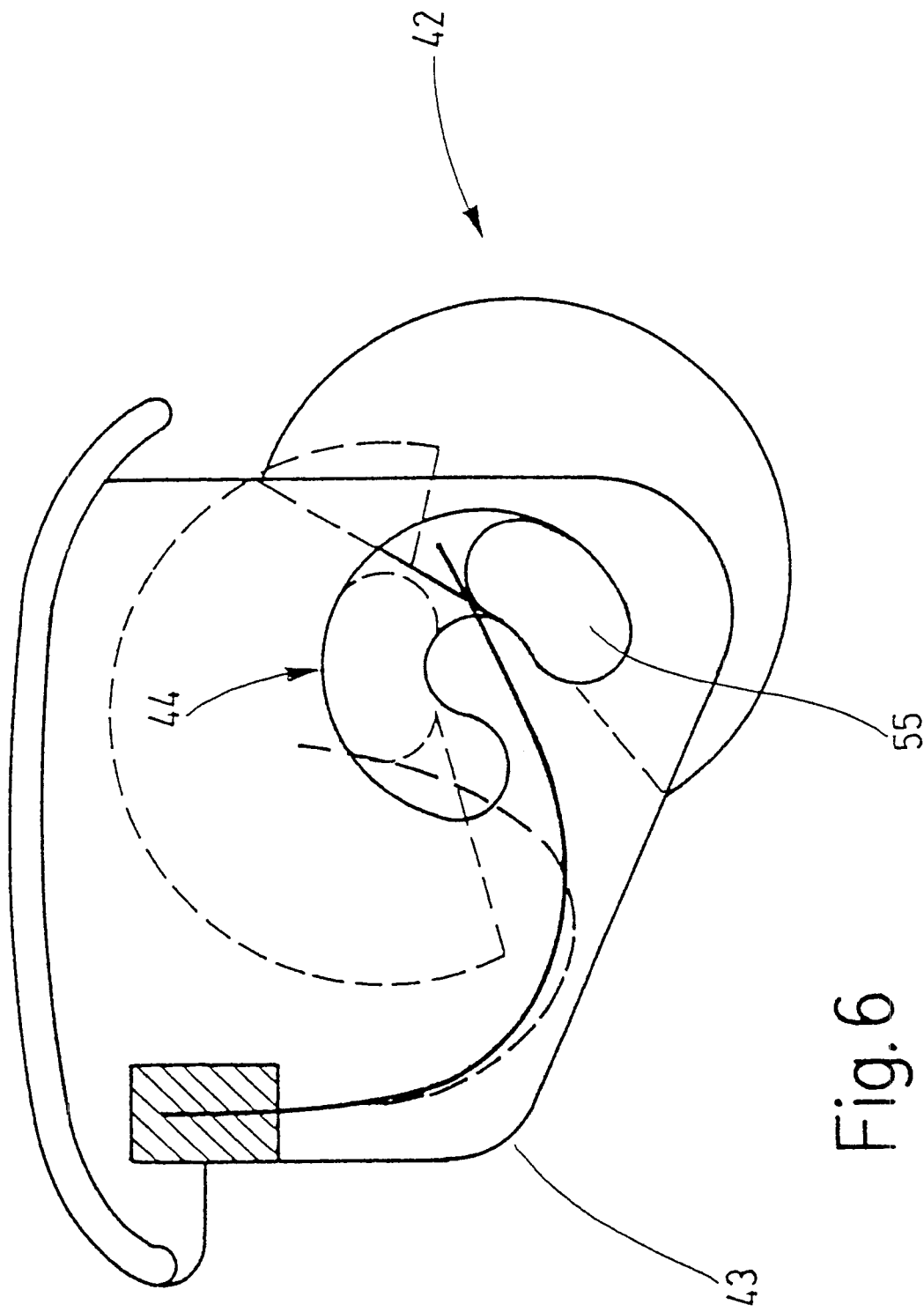
FIG. 6 is a side elevation view of a further embodiment of a guide element for the window blind of FIG. 1.

FIG. 6 shows an embodiment in which, instead of the guide roller 41, a guide skid 41 is used. The guide slot 44 has a constant curvature over its length and everywhere the same slot width. Its position is as represented in the figure, or as it results from the functional description given below.

The guide skid 41 has the form of a circular sector of more than 180°, and it consists of friction-poor material, for example PTFE. The guide skid 41 is a plane-parallel plate that fits between the two bearing flanges 43 and which is provided in the vicinity of its straight edge with two guide pins 55 which are aligned with one another. Each guide pin 55 has an about reniform shape, and, namely, the pin has the same curvature as the guide channel 44 and is merely somewhat shorter in the peripheral direction. Here the guide skid 41 is prevented from tilting. The only movement that it can execute is a movement along the circular arc that is given by the guide channel 44.

The reeled-out state is illustrated in FIG. 6 with continuous lines and one perceives how the guide skid 41 with its circumferential surface overhangs the edge of the cover strip 25. Otherwise the movement occurs about an axis which again lies parallel to the lengthwise extent of the cover strip 25 or of the pullrod 13.

In the reeling-in the guide skid 41 similarly as the guide roller 41 is pressed upward from the slot edge 22 into the position shown in broken lines in FIG. 6. There the bending spring 52 is more strongly bent.

Conversely, the bending spring 52 presses the guide skid 41 into the position drawn in solid lines according to FIG. 6 as soon as, in the traveling-out of the roll-up window blind, it has come free from the outlet slot 7.

Figure 7:
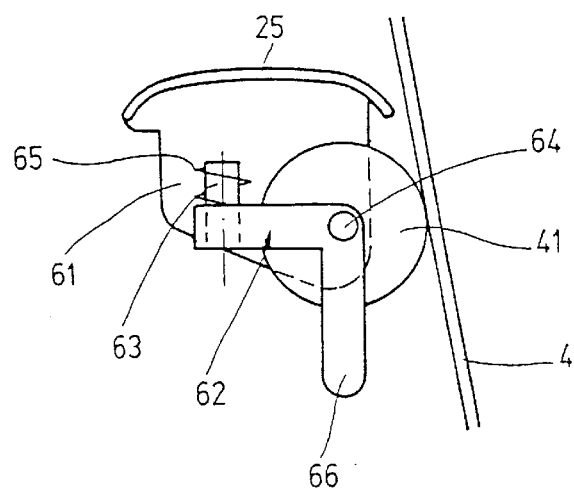
FIGS. 7–9 are side elevation views of another embodiment of a guide element for the window blind of FIG. 1 which includes a pivotable bearing carrier.
Figure 8:
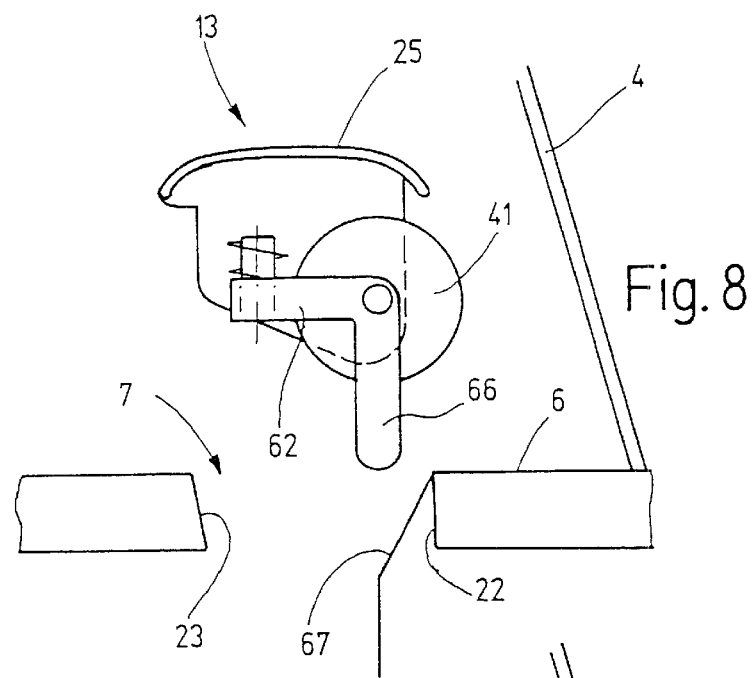
Figure 9:
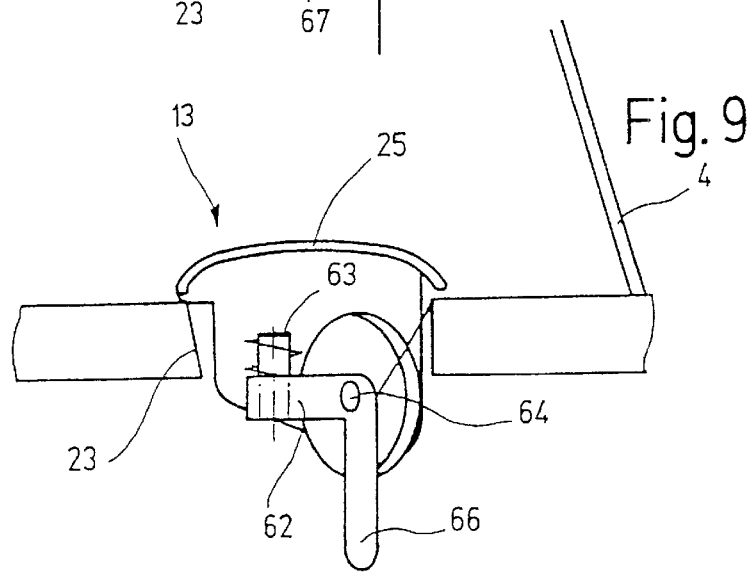

In the two embodiments explained before, the yielding movement of the guide elements 41 occurs about an axis that is aligned parallel to the longitudinal extent of the pullrod 13. FIGS. 7 to 9, in which the retreat movement occurs with respect to an axis which stands perpendicular on the longitudinal axis of the pullrod 13.

Also FIGS. 7 to 9 are much schematized and show merely the parts required for the bearing of the guide element 41 in a simplified form.

On a holding flange 61 leading downward from the cover strip 25, a bearing carrier 62 is swingably borne. The bearing carrier 62 carries an upward extending bearing pin 63 which is turnably borne in a bearing bore (not shown) of the holding flange 61. The axis of rotation runs vertically and at a right angle to the longitudinal axis of the pullrod 13. On the free end facing the window pane 4, of the bearing carrier 62, the guide roller 41 is turnably borne. By means of a winding spring 65, the bearing carrier 62 is pre-stressed in the end position in which the guide roller 41 overhangs the outer contour of the cover strip 25. In this position, the axis of rotation of the guide roller 41 runs parallel to the section of the ordinarily curved windowpane 4 on which the guide roller 41 lies. In this manner, the force active between the guide roller 41 and the windowpane 4 generates no torque with respect to the bearing pin 63.

Underneath the axis of the guide roller 41 the bearing part carries a control lever 66. This control lever 66 cooperates with an oblique surface 67 which is formed on the slot edge 22. The oblique surface 67 provides that in the plunging of the control lever 66 the contact between the actuating lever 66 and the oblique surface 67 swings the bearing carrier around about the axis defined by the bearing pin 63, so that the roller 41 is folded back in the desired manner with respect to the outer contour of the cover strip 25 in order to fit into the outlet slot 7.

Otherwise, the function and manner of functioning is similar to that described above.

A roll-up window blind for automobile rear windows has two actuating levers, with which the pullrod is moved in the direction of a reeling-out or reeling-in of the rouleau web. The levers are borne in such manner that in the reeled-out state the pullrod is pressed with a pre-stressing force against the rear window pane. In order to avoid a damaging of the heating wires, the pull rod is provided on end side with guide elements which are movably mounted on the pullrod. With a reeled-out blind they project beyond the outer contour of the pullrod and, while they themselves lie against the rear windowpane, they hold the pull rod at a distance from the rear windowpane. In the reeling-in they are drawn back behind the outer contour of the pullrod, so that they can be withdrawn into the slot from which the blind material emerges, and, namely, without recesses being necessary on the slit edges for the guide elements.

What is claimed is:

1. A roll-up window blind for a window of a motor vehicle, the window having an associated window pane, the roll-up blind comprising:

a rotatable winding shaft, a blind material having parallel first and second edges with the first edge being connected to the winding shaft for movement between a reeled-in position and a reeled-out position, a first drive arrangement which pre-stresses the winding shaft in a direction corresponding to moving the blind material to the reeled-in position, a pull rod fastened to the second edge of the blind material, at least one deflection-resistant actuating element for transferring an associated second drive arrangement between a first position in which the pullrod is disposed adjacent the winding shaft and a second position in which the pullrod is disposed relatively further away from the winding shaft, and two guide elements for guiding the pull rod on the window pane, the guide elements being disposed in spaced relation to each other and being supported on the pull rod by corresponding bearing arrangements for movement between a first retracted position and a second guide position, wherein in the first retracted position the guide elements are retracted with respect to a circumferential surface of the pullrod and in the second guide position the guide element project beyond the circumferential surface of the pullrod in order to guide the pull rod on the window pane as the blind material moves from the reeled-in position to the reeled-out position.

2. A roll-up window blind according to claim 1, wherein the winding shaft is supported in a housing having an outlet slot for the blind material.

3. A roll-up window blind according to claim 1, wherein the winding shaft is supported in a housing installed into a hat deposit area of the motor vehicle.

4. A roll-up window blind according to claim 3, characterized in that an outlet slot for the blind material is contained in a hat deposit area of the motor vehicle.

5. A roll-up window blind according to claim 1, wherein the first drive arrangement is a spring motor which is located inside the winding shaft.

6. A roll-up window blind according to claim 1, further including an outlet slot for the blind material and wherein the pullrod and the outlet slot have complementary shapes such that when the blind material is in the reel-in position the pullrod closes the outlet slot except for an annular gap surrounding the pullrod.

7. A roll-up window blind according to claim 1, further including an outlet slot for the blind material and wherein the pullrod and the outlet slot have complementary shapes such that when the blind material is in the reel-in position the pullrod closes the outlet slot.

8. A roll-up window blind according to claim 1, wherein each actuating element comprises an actuating lever pivotably supported beside the winding shaft, each actuating lever having a free end that cooperates with the pullrod and being pivotable from a first position in which the actuating lever extends about parallel to the winding shaft into a second position in which the actuating lever is at about a right angle to the winding shaft.

9. A roll-up window according to claim 1, wherein the guide elements comprise slide skids.

10. A roll-up window blind according to claim 1, wherein the guide elements comprise rotatable rollers.

11. A roll-up window blind according to claim 1, wherein each bearing arrangement includes a slide-block guide.

12. A roll-up window blind according to claim 11, wherein the side-block guide has a curved guide slot for leading the guide element along a path.

13. A roll-up window blind according to claim 12, wherein the guide slot is curved in a continuous form.

14. A roll-up window blind according to claim 12, wherein the guide slot has an L-shaped form.

15. A roll-up window blind according to claim 11, wherein each bearing arrangement includes a bearing carrier which is pivotable about a bearing axis.

16. A roll-up window blind according to claim 15, characterized in that the bearing axis extends approximately parallel to a plane defined by the blind material in the reeled-out position.

17. A roll-up window blind according to claim 15, wherein the bearing axis extends at a right angle to the pullrod.

18. A roll-up window blind according to claim 1, wherein each guide element has and associated pre-stressing device for pre-stressing the guide element toward the second guide position.

19. A roll-up window blind according to claim 11, wherein each bearing arrangement has an associated pre-stressing device for pre-stressing the guide element toward the second guide position.

20. A roll-up window blind according to claim 18, wherein the pre-stressing device includes a bending spring.

21. A roll-up window blind according to claim 1, wherein each guide element is movable along a path that curves about an axis is parallel to a longitudinal axis of the pullrod between the first retracted position and the second guide position.

* * * * *

UNITED STATES PATENT AND TRADEMARK OFFICE
CERTIFICATE OF CORRECTION

PATENT NO. : 6,422,291 B1 Page 1 of 1
APPLICATION NO. : 09/762374
DATED : July 23, 2002
INVENTOR(S) : Bernd Brunnert, Marina Ehrenberger and Holger Seel It is certified that error appears in the above-identified patent and that said Letters Patent is hereby corrected as shown below:

In claim 1, column 8, line 47, the term

"transferring"

should read:

--transfer by--

Signed and Sealed this

Twenty-first Day of December, 2010

David J. Kappos
*Director of the United States Patent and Trademark Office*

(12) EX PARTE REEXAMINATION CERTIFICATE (8951st)
United States Patent
Brunnert et al.

(10) Number: US 6,422,291 C1
(45) Certificate Issued: Apr. 10, 2012

(54) ROLL-UP BLIND WITH STOWABLE GUIDING MEMBERS FOR THE WINDOW OF A VEHICLE

(75) Inventors: Bernd Brunnert, Plochingen (DE); Marina Ehrenberger, Esslingen (DE); Holger Seel, Aidlingen (DE)

(73) Assignee: Baumeister & Ostler GmbH & Co., Aichwald (DE)

Reexamination Request:
No. 90/011,790, Jul. 9, 2011

Reexamination Certificate for:
Patent No.: 6,422,291
Issued: Jul. 23, 2002
Appl. No.: 09/762,374
Filed: Mar. 19, 2001

Certificate of Correction issued Dec. 21, 2010.

(22) PCT Filed: Jul. 26, 1999

(86) PCT No.: PCT/DE99/02288
§ 371 (c)(1), (2), (4) Date: Mar. 19, 2001

(87) PCT Pub. No.: WO00/07837
PCT Pub. Date: Feb. 17, 2000

(30) Foreign Application Priority Data
Aug. 4, 1998 (DE) .......................................... 198 35 257

(51) Int. Cl.
*B60J 3/00* (2006.01)

(52) U.S. Cl. ................... 160/370.22; 160/265; 296/97.4; 296/97.8

(58) Field of Classification Search .......................... None
See application file for complete search history.

(56) References Cited

To view the complete listing of prior art documents cited during the proceeding for Reexamination Control Number 90/011,790, please refer to the USPTO's public Patent Application Information Retrieval (PAIR) system under the Display References tab.

*Primary Examiner* — Joseph A. Kaufman

(57) ABSTRACT

A roll-up window blind (5) for automobile rear windows panes (4) has two actuating levers (9, 11) with which the pullrod (13) is moved in the direction of reeling-out or reeling-in of the blind material (12). The levers (9, 11) are borne in such manner that, in the reeled-out state, the pullrod (13) is pressed with a tension force against the rear window pane (4). In order to avoid any damage to the heating wires, the pullrod (13) is provided on its ends with guide elements (41), which are mounted movably on the pullrod (13). With the blind (5) reeled out, they project over the outer contour of the pullrod (13) and, as they themselves come to lie on the rear window pane (4), they hold the pullrod (13) at a distance from the rear window pane (4). On reeling-in they are retracted behind the outer contours of the pullrod (13), so that they can be retracted into the slot (7) from which the blind material emerges, and, namely, without recesses for the guide elements being necessary on the slot edges (22).

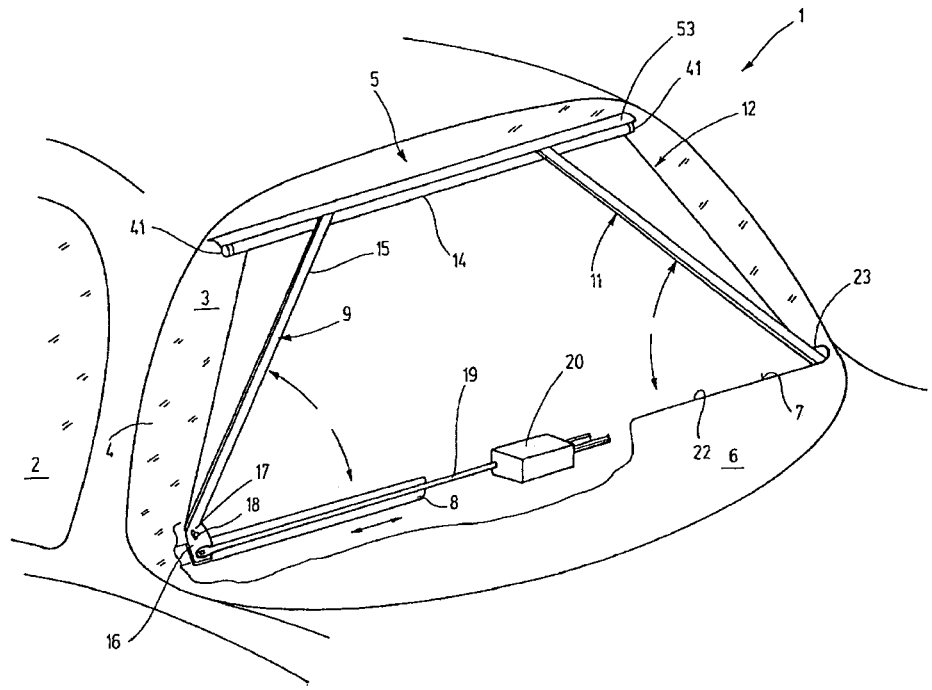

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-21 is confirmed.

* * * * *